United States Patent [19]

Falco et al.

[11] Patent Number: 4,887,901
[45] Date of Patent: Dec. 19, 1989

[54] OPTICAL FIBER DETECTION SYSTEM USING AN INTENSITY-MODULATING SENSOR

[75] Inventors: Lucien G. Falco, Cressier; Olivier M. Parriaux, Lausanne, both of Switzerland

[73] Assignee: Centre Suisse D'Electronique Et De Microtechnique S.A., Switzerland

[21] Appl. No.: 888,889

[22] Filed: Jul. 24, 1986

[30] Foreign Application Priority Data

Jul. 30, 1985 [FR] France .................................. 85 11616

[51] Int. Cl.⁴ ................................................ G01B 9/02
[52] U.S. Cl. .................................... 356/352; 356/345
[58] Field of Search ................ 356/345, 352, 35.3, 356/43, 44, 48; 250/227

[56] References Cited

U.S. PATENT DOCUMENTS 4,533,247 8/1985 Epworth ............................ 356/345

FOREIGN PATENT DOCUMENTS 0021199 1/1981 European Pat. Off. ............ 356/345
2056672 3/1981 United Kingdom ................ 356/345
2096762 10/1982 United Kingdom ................ 356/345

OTHER PUBLICATIONS

"Passive Fiber-Optic Ring Resonator for Rotation Sensing", Meyer et al., Optics Letters, 12-1983.
Second International Conference Relating to Optical Fiber Sensors, pp. 387-390, Sep., 1984, "Displacement Sensor Using A Compensated Fibre Link", D. E. N. Davies, et al.

Primary Examiner—Davis L. Willis
Assistant Examiner—S. A. Turner
Attorney, Agent, or Firm—Arnold, White & Kurkee

[57] ABSTRACT

The present invention relates to optical fiber measuring systems comprising a light source, a modulator for modulating the amplitude of the light signal emitted by the light source at a modulation frequency, an optical connecting fiber, a resonant cavity, a phase detector and a phase comparator. According to the invention, a sensor which is sensitive to an ambient parameter is incorporated into the cavity such that a variation in the parameter causes a variatioin in the phase of the signal at the modulation frequency. The invention can be applied to measuring systems for use in a severe environment.

6 Claims, 2 Drawing Sheets

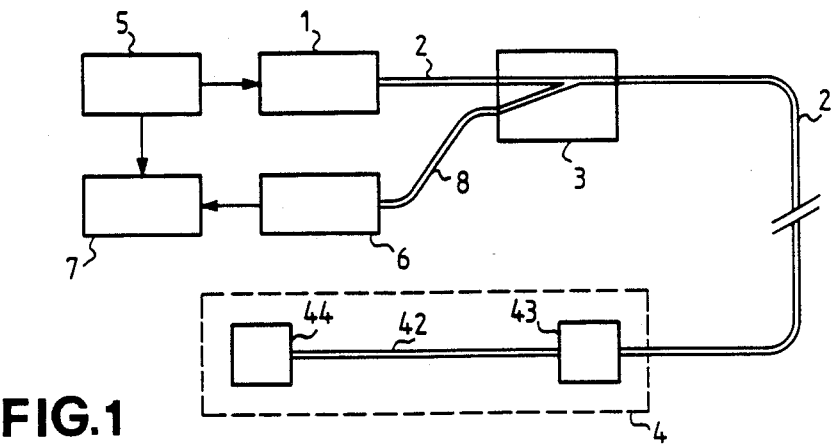
FIG.1
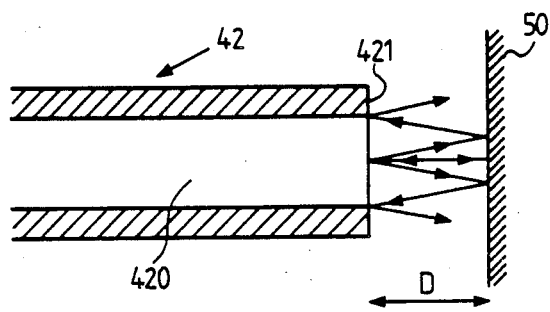
FIG.2.a
FIG.2.b
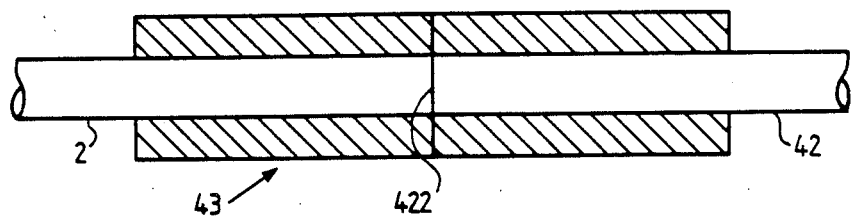

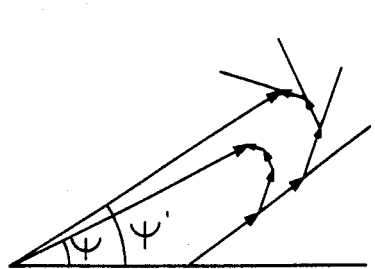
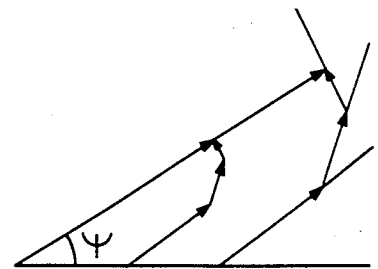
FIG.3.a  FIG.3.b
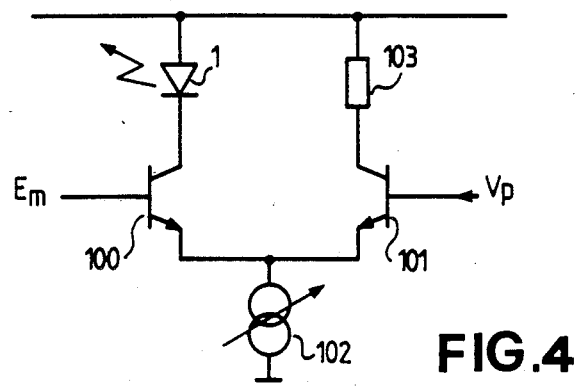
FIG.4
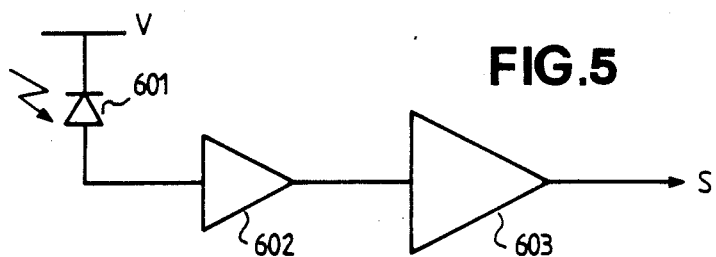
FIG.5

OPTICAL FIBER DETECTION SYSTEM USING AN INTENSITY-MODULATING SENSOR

TECHNICAL FIELD

The present invention relates to optical systems for detecting and/or measuring the variation in a physical or chemical parameter wherein the variation in the parameter to be detected and/or measured induces a variation in the intensity of the light in an optical waveguide.

BACKGROUND

Intensity-modulating optical fiber sensors are put to many practical uses when the advantages inherent in optical detection and transmission (such as, for example, immunity to electromagnetic effects, safety factor in an explosive or inflammable atmosphere, miniaturization, simplicity and low cost, etc.) are needed. However, the use of this type of sensor is limited by virtue of its low degree of linearity, its lack of accuracy and above all the fact that the light intensity which constitutes the information from the sensor may be disturbed all along the path between the light source, the sensor and the detector. Moreover, the signal received, for a given sensor, depends on the length of the transmission line between the emitter and the sensor. D.E.N. Davies et al, in an article entitled 'Displacement Sensor Using a Compensated Fibre Link,' which was presented at the second international conference relating to optical fiber sensors, held in Stuttgart, in Sept. 1984, have proposed a system incorporating a displacement sensor and in which means are provided to compensate for the effects of a variation in the power of the light source, the sensitivity of the receiver or attenuation of the fiber. This compensation effect is achieved by the incident light being divided between two paths, one of which incorporates the sensor itself while the other is used as a reference path. The system described requires a complicated sensing cell comprising a coupler, two fibers and a set of lenses. Such a construction is expensive and is therefore poorly suited to uses in which a large number of sensors would be required.

SUMMARY OF THE INVENTION

An object of the present invention is to provide an optical fiber detection system incorporating an intensity modulating sensor and which does not suffer from the above-described disadvantages.

Another object of the invention is to provide a detection and/or measuring system which has a self-calibration action.

Another object of the invention is to provide a system for permitting detection and/or measurement of a plurality of physical or chemical parameters by means of a respective number of sensors which are connected in series.

Another object of the invention is to provide a detection and/or measuring system which is simple, sensitive, accurate and inexpensive.

The invention is based on modulation of the light signal, by use of a resonant cavity in which the sensor responsive to the parameter to be detected or measured is incorporated. The resonant cavity provides for transformation of the modulation of intensity produced by the sensor into phase information. The main advantages of the system are the simplicity of the sensing head as the resonant cavity may be formed by a single optical fiber, and the independence of the information transmitted in relation to the variation in the light emitted by the source as well as the transitional phenomena which affect the information transmision medium.

Other objects, features and advantages of the present invention will be more clearly apparent from the following description of a particular embodiment, the description being given purely by way of illustration, and with reference to the accompanying drawings.

BRIEF DESCRIPTION OF THE DRAWINGS

FIG. 1 is a diagrammatic view illustrating the system according to the invention;

FIG. 2a is an optical displacement sensor which can be used in the system of the invention;

FIG. 2b is one of the ends of the resonant cavity;

FIGS. 3a and 3b are vectorial diagrams illustrating the mode of operation of the resonant cavity;

FIG. 4 is the diagrammatic view of a modulator for modulating the amplitude of the signal emitted by a light emitting diode; and FIG. 5 is a diagrammatic view of a detector which can be used with the system of the invention.

DETAILED DESCRIPTION

The system for detecting and/or measuring the variation in a parameter, as shown in FIG. 1, comprises a light source 1 coupled to an optical fiber 2 which is connected to a resonant cavity 4 which incorporates a transducer element. The light emitted by the source 1 is amplitude modulated by a modulator circuit 5. The use of a resonant cavity such as a Fabry-Perrot cavity in which a transducer is incorporated makes it possible to provide for transformation of the information in respect of variation in the light intensity produced by the transducer element in response to the variation in the parameter to be measured, into phase information. The phase information is extracted by means of a detector 6 which is coupled to the optical fiber 2 by the optical connection 8 and the coupler 3. A vectorial voltmeter or phase meter 7 compares the phase information supplied by the detector 6 to the phase of the modulation signal supplied by the modulator circuit 5.

The resonant cavity 4 is formed by a fiber 42 whose ends have partially reflective surfaces. The cavity is coupled to the fiber 2 by a connector 43 and is terminated by a terminal element 44. According to the invention, the cavity incorporates a transducer which reacts to the variation in the parameter to be measured, by modifying the intensity of the signal passing through the fiber 42. Fibers 2 and 42 can be single mode or multimode fibers.

By way of example of the transducer, FIG. 2a is a diagrammatic view of a position sensor which is incorporated in the cavity formed by the fiber 42. The transducer of the disclosed embodiment is a displacement transducer and is formed by means of a mirror 50 disposed at a distance D from the end of the fiber 42. The amount of light which is reinjected into the core 420 of the fiber 42 is directly dependent on the distance D. Consequently the intensity of the light signal passing through the fiber 42 is a measurement of the position of the mirror 50. The Fabry-Perrot resonant cavity, as has been indicated hereinbefore, is produced by means of an optical fiber 42 having the transducer described above at one end and connected at the other end to the fiber 2 by means of a ferrule 43. The end face 421 of the fiber 42, and the interface 422 between the fiber 2 forming the transmission means and the fiber 42 forming the resonant cavity, may be covered by a deposit of silicon oxide (SiO) or titanium oxide ($TiO_2$) so as to be partially reflective.

Although described within the framework of a use in which the resonant cavity is used in a reflection mode, the present invention can also be employed in the situation where the cavity is used in a transmission mode. The connecting fiber 2 in the drawing would then be extended beyond the cavity 4 directly to the detector 6. The choice as between one system or the other will be governed by the use envisaged.

FIGS. 3a and 3b show the effect of a change of state (FIG. 3a) or an absence of change of state (FIG. 3b) of the sensor, on the phase $\Psi$ of the signal circulating in the cavity 4. The periodic signal phase $\Psi$, of a frequency equal to the modulation frequency and circulating in the cavity 42, may be considered as the sum of a plurality of elementary phase shifts produced in the successive backward and forward travels of the light in the cavity after partial reflection at the semi-reflecting mirrors 421 and 422. The cavity always being the same, the respective directions of the elementary phasors remain the same. In contrast, the respective magnitudes of the elementary phasors are affected by a variation in the intensity of the light signal generated by a change in state of the transducer. That effect is shown by a change in the phase $\Psi$ of the resulting signal R (see FIG. 3a). That variation in the phase $\Psi$ is independent of the fluctuations in the intensity of the signal, whether they are due to the light source 1 or the transmission line 2.

The resonant cavity 4 may be characterized by reference to its electrical length: $\beta = 4\pi f\, nl/c$, where: f is the frequency of the modulation signal, n is the mean index of the fiber 42, l is the length of the cavity and c is the speed of light. The sensitivity of the system shown in FIG. 1 is at a maximum when $\beta$ is close to $\pi$ but that value also corresponds to a very low level of intensity of the signal to be measured so that it is necessary to make a compromise in order for the intensity of the signal received by the detector to be adequate, while having the best possible level of sensitivity.

FIG. 4 is a diagrammatic view showing an amplitude modulator for a light source formed by a light emitting diode. The assembly shown in FIG. 4 comprises a differential amplifier using bipolar transistors. The emitters of the transistors 100 and 101 are connected to an adjustable current source 102. The base of the transistor 101 is connected to a fixed voltage Vp while its collector is connected to a feed voltage V by way of a biasing resistor 103. At its base, transistor 100 receives the modulation signal Em, which gives rise to modulation of the emitter current passing through the diode 1. The modulation signal may be a periodic signal of sinusoidal or pulse type.

FIG. 5 is a diagrammatic view of the detector used in the present invention. The current produced by the photodiode 601 (PIN diode or avalanche diode) is applied to the input of a transconductance amplifier 602. The amplifier 602 provides for transformation of the current produced by the diode 601 into a voltage which is applied to an amplifier 603 whose output S is connected to an input of the phase meter 7 (FIG. 1).

One of the advantages of the system of the invention in which intensity modulation is transformed into phase information is that detection can be effected in a very narrow band mode, with a very good signal-noise ratio.

Although the invention has been described in a particular embodiment, it will be clear that it may be the subject of modifications or variations without departing from the scope thereof. In particular, other types of sensors may be used provided they are capable of producing modulation of the light signal passing through the resonant cavity. Pressure, temperature, etc. sensor are some of the sensors which can be used. It will also be clear that the system according to the invention may incorporate a plurality of sensors which are distributed along the optical line.

We claim:

1. An optical system for sensing a variation in a physical or chemical parameter comprising:
   light source means for producing a light signal;
   means for amplitude modulating said light signal at a modulation frequency to produce a modulated light signal;
   optical fiber means, connected to said light source mans and said means for modulating for guiding said modulated light signal;
   at least one sensor connected to said optical fiber means, each sensor comprising transducer means and resonant cavity means for producing a variation in phase of said modulated light signal at said modulation frequency; and
   detecting means, optically coupled to said optical fiber means;
   wherein:
   said amplitude modulating is high frequency modulation;
   said transducer means produce a variation in intensity of said modulated light signal responsive to said variation in said physical or chemical parameter;
   said resonant cavity resounds at said high frequency modulation;
   said variation in phase of said modulated light signal is responsive to said variation in intensity; and
   said detecting means, optically coupled to said optical fiber means, detects said variation in said phase of said modulated light signal at said high frequency modulation.

2. An optical system according to claim 1 wherein said resonant cavity means is formed by an optical fiber having ends covered by a semi-reflective material.

3. An optical system according to claim 1 wherein said means for detecting said variation in said phase of said modulated light signal comprise phase detector means for receiving said modulated light signal extracted from said cavity means, and phase meter means for comparing an output of said phase detector means with a phase of the modulation frequency.

4. An optical system according to claim 3 wherein said phase detector means is coupled to said optical fiber by way of a coupler, said cavity means being used in a reflection mode.

5. An optical system according to claim 1 wherein said optical fiber means and said resonant cavity means are formed by single-mode optical fibers.

6. An optical system according to claim 1 wherein said optical fiber means and said resonant cavity means are formed by multi-mode optical fibers.

* * * * *